June 15, 1926.
K. H. BROWNLEE
1,588,654
VENTILATOR FOR CLOSED VEHICLES
Filed Oct. 27, 1924  2 Sheets-Sheet 1
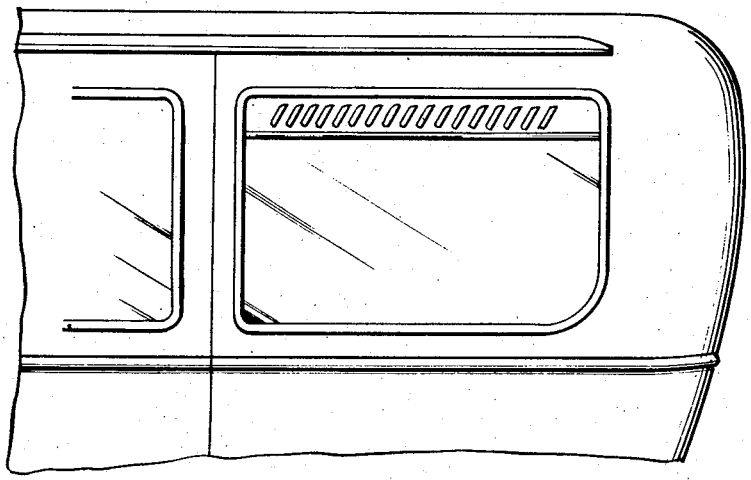
Fig.1
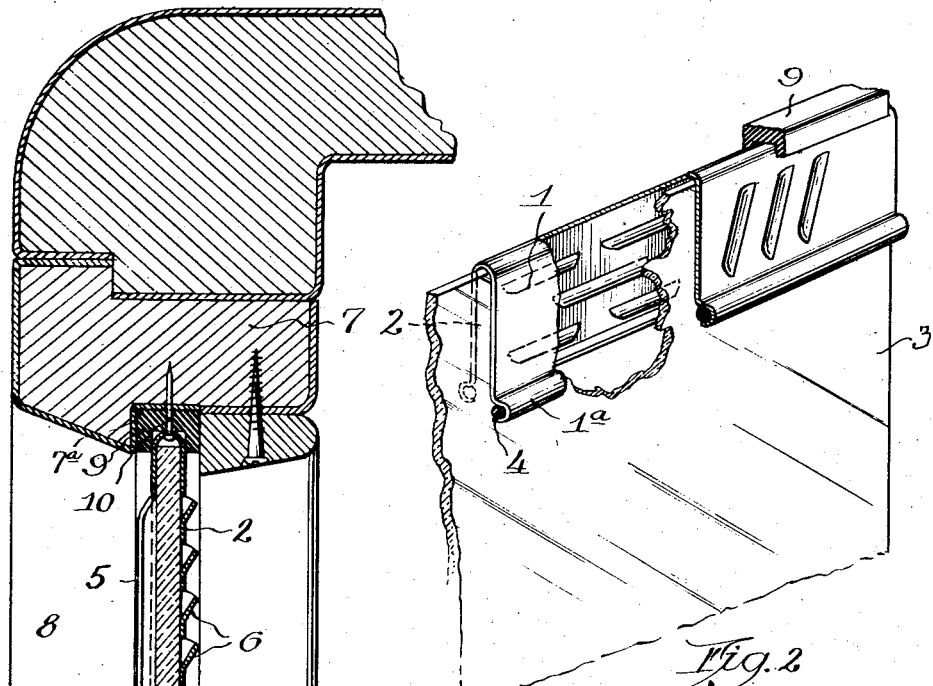
Fig.2
Fig.3
Witness:
Chas. K. Tourish
Inventor,
Kenneth H. Brownlee
Offield, Mehlhope, Scott & Poole Attys.

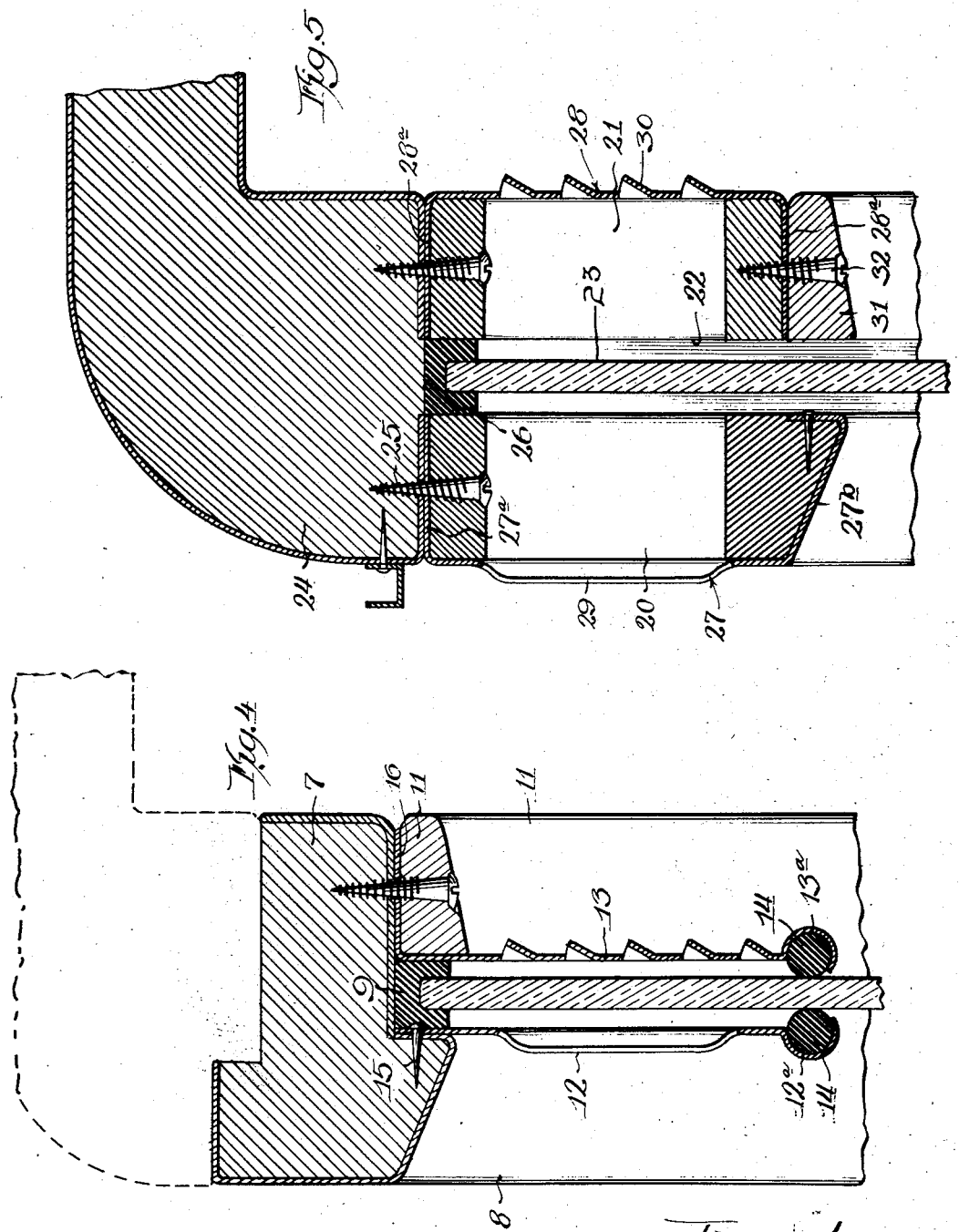

Patented June 15, 1926.

1,588,654

UNITED STATES PATENT OFFICE.

KENNETH H. BROWNLEE, OF EVANSTON, ILLINOIS.

VENTILATOR FOR CLOSED VEHICLES.

Application filed October 27, 1924. Serial No. 746,071.

This invention relates to improvements in ventilators for closed vehicles, and more particularly to ventilator panels which may be inserted or built into the window or door sash of closed vehicle bodies and co-acting with the vertically adjustable glass panels for regulating or controlling the passage of air from the interior of the vehicle.

A ventilating panel embodying the general features of the construction above pointed out is disclosed in my prior application filed on October 1, 1923, Serial No. 665,760 in which the panel is designed to be removably inserted between the top rail of the window sash and the upper edge of the adjustable glass panel. The present ventilator in performing substantially the same functions as its predecessor, embodies several novel features and improvements which are believed to add materially to its usefullness and adaptability as permanent installations in the closed vehicle bodies.

The preferred embodiment of the invention is disclosed in the accompanying drawings in which—

Figure 1 is a view of the rear portion of a closed vehicle showing the ventilator as it would ordinarily be applied.

Figure 2 is an enlarged perspective view of the ventilator installed and a portion thereof broken away to show its position with reference to the window sash and glass panel.

Figure 3 is an enlarged view in vertical section taken through the top rail of the window ventilator and upper portion of the glass panel and illustrating the manner in which the ventilator may be applied to a vehicle.

Figure 4 is a sectional view similar to Figure 3, showing a slightly different construction of the ventilator as used for permanent installation, and Figure 5 is another modification showing the adaptation of the ventilator, as built into the window construction.

The solution of the problem of closed vehicle ventilation does not depend so much on providing openings for the admission of air to the enclosed passenger compartment as it is to provide suitably arranged and located openings for the removal of the foul and vitiated air from within the vehicle. Ample air is admitted to the compartment through the crevices about the wind shield, cracks in the floor boards, as well as through adjustable cowl ventilators and a recently designed type of wind shield which can be raised and lowered similarly to the adjustable window panels. Complete ventilation therefor can only be obtained by providing an outlet for the air, preferably in the rear portion of the body, as, for instance, by partially opening one of the windows. Such an arrangement, however, is not practical in inclement and stormy weather, and therefore continuous ventilation is only possible when the weather is such as to permit of the opening of one or more windows.

To insert a panel in the window with suitable openings therein does not solve the problem since such a panel must be proof against weather conditions, that is to say, it must permit the removal of the air and at the same time prevent rain and snow from driving through the openings or louvers. Shutters or slides having apertures to register with openings in the fixed panels are open to objection, for the reason that they get out of order readily or become loose and tend to rattle. Moreover, devices of this character are troublesome to operate and usually out of reach and therefore neglected, in which event they become useless as ventilating devices or as a protection against weather conditions. The present device is completely devoid of adjustable parts and is especially unique in that the control of the passage of air through the ventilator where such is necessary, is accomplished by the lowering and raising of the glass panel, by the usual crank or lever type of window regulators now extensively in use.

Figure 1 illustrates the preferred method of applying the ventilator, as, for instance, in each of the rear side windows of the vehicle body. The ventilator has the appearance of a long narrow panel extending downwardly from the upper rail of the window for a distance of approximately three inches. On the outside, as well as the inside of the panel are formed louvers or openings through which the air may pass, these outside and inside louvers being especially designed to properly remove the air as well as to prevent the rain and snow from driving into the vehicle or causing uncomfortable drafts when the vehicle is not in motion. This feature of the ventilator will presently be described.

Referring to Figure 3, it will be seen that the ventilator is constructed of sheet metal of a suitable grade and gauge and consisting of double walls formed by bending the metal into U-shape along one of its longitudinal edges, thereby forming an outer wall 1 and an inner wall 2, the distinction between these walls being due to the particular form of louvers therein. The distance between the outer and inner walls of the ventilator shown in Figure 3 is substantially equal to the thickness of the glass panel 3 of the window.

The upper edge of the panel engages the top rail of the window in a manner presently to be pointed out, whereas the opposite or lower edge is open, the marginal portions thereof being bent or shaped into substantially cylindrical form, thereby providing inwardly facing rabbets 1ª and 2ª respectively, within which round strips 4 of felt or rubber are inserted, these strips projecting slightly beyond the plane of the inner surfaces of the opposite walls 1 and 2.

In the outer wall are formed or stamped a plurality of parallel louvers 5 extending transversely of the panel, but at the same time slightly oblique to the longitudinal edges. These parallel louvers extend substantially throughout the length of the panel, although terminating short of the ends. Formed on the inner wall 2 of the panel is another series of louvers 6 which extend lengthwise of the panel and open toward the upper edge thereof. As a preferable arrangement these inside louvers are relatively short in length and arranged in two or more rows, the louvers of each row being staggered as clearly shown in Figure 2.

In applying the ventilating panels to a window, the outside louvers open outwardly and due to their obliquity, face downwardly to a slight extent, whereas the inside louvers open upwardly toward the ceiling of the passenger compartment as already suggested. Inasmuch as a ventilator is usually placed in each of the rear side windows, it follows that they must be made in rights and lefts, so that the outside louvers will face rearwardly on both sides of the vehicle. It is manifest from this that in the forward movement of the vehicle a suction is created on the outside of the panels due to the rush of air transversely of the rearwardly facing openings formed by the outside louvers, thus drawing the air through the upwardly opening inside louvers, and from the strata nearest the ceiling and therefore most obnoxious. Due to this arrangement of louvers it is manifest that rain and snow cannot pass through the ventilating panel, even when the vehicle is standing stationary, inasmuch as the upwardly opening arrangement of the inside louvers affords protection against the further passage into the interior of the vehicle. Moreover, when the vehicle is stationary there may be a tendency for the air to pass through the ventilating panels into the vehicle from the outside, but again, due to the arrangement of the inside louvers, the air is deflected upwardly and not directly upon the occupants.

It may be explained that the type of ventilator shown in Fig. 3 is especially designed for closed vehicles in which no ventilation has been provided for, and therefore, is more in the nature of an accessory which may be easily inserted. As is common in vehicle window construction, the window opening is surrounded by a top rail 7 and side rails 8. In these side and top rails are formed channels or grooves 7ª and 8ª respectively which are lined with felt strips or channels 9 in which the glass panel 3 slides, the purpose of these felt strips being to prevent the glass panel from rattling. To apply the ventilating panel of the type shown in Figure 3, it is only necessary to lower the window sufficiently to permit the insertion of a panel into the vertical channels of the side rails 8 and force it upwardly into the channel 7ª of the top rail 7, the upper edge of the panel fitting snugly within the felt channel strip 9 therein. By driving nails or brads 10 through the upper edge of the panel and into the top rail 7 the panels are permanently secured in place. Moreover, the rabbets 1ª and 2ª along the lower edge of the panel fits snugly within the vertical grooves of the side rails 8 and hold the panel in vertical position. At the same time the opening along the lower edge of the panel and between the strips 4 therealong provides an opening through which the upper portion of the glass panel 3 may slide. Thus, if it is desired that the ventilators shall be in operation, the glass panel can be lowered in the customary manner until the louvers are uncovered, the upper edge of the glass panel being preferably retained between the lower edges of the panel. On the other hand, if for any reason there is a tendency for the rain or snow to drive through the ventilator, it is possible to move the glass panel upwardly and thereby seal the window as tightly as though the panel was not present. Similarly, the amount of air which can pass through the panel can be regulated by adjusting the glass panel within the ventilating panel and thereby increasing or diminishing the amount of ventilation.

Figure 4 shows a similar type of ventilating panel, designed as a semi-permanent installation. As before, the window is formed with channeled top and side rails 7 and 8. Surrounding the inside of these rails is a removable bead 11 which is screwed to the under face of the top rail.

In this form, the ventilating panel consists of two separate strips or panels, namely, the outside panel 12 and the inside panel 13. The louver arrangement is the same, as well as the rabbets 12$^a$ and 13$^a$ at the bottom edges, although they are made slightly larger with larger cushion strips 14 therein, since the distance between the panels is somewhat greater.

The outer panel 12 has a straight upper edge which is fastened to the outer side face of the channel 7$^a$ in the top rail 7 by nails or brads 15. The inner panel has a marginal flange 16 bent at right angles and away from the outer panel, this marginal flange being inserted between the bead 11 and the under side of the top rail 7. To install this form of the device it is obviously necessary to remove the bead 11 along the top rail and although it entails more work, a practically permanent installation is made. Otherwise the function and mode of operation is the same as before.

In Figure 5, a somewhat more elaborate construction is shown such as could be permanently built into the body.

In this construction the upper portion of the window opening is formed by two horizontal rails of wood, 20, 21, each having a single continuous opening, or a series of such openings, substantially the full height thereof. These rails are spaced apart and their over all width conforms to the width of the window frame. The space between the rails is of the same width as the side channels 22 in which the glass window panel 23 slides. These rails are fastened to the upper portion 24, of the body by means of screws 25 and for all practical purposes form a part of the body. Between the upper edges of the rails is the usual cushioning strip 26.

As in the semi-permanent form shown in Figure 4, the ventilator consists of two separate outer and inner panels of sheet metal, 27 and 28 respectively. The outer panel 26, provided with the same arrangement of louvers 29 as already described, is secured against the face of the outer rail 20 and has angular marginal portions or flanges at top and bottom, 27$^a$ and 27$^b$. The upper flange 27$^a$ is bent at right angles and is secured between the upper edge of the rail and the body 24, by means of the screws 25. The lower flange 27$^b$ extends over and around the lower edge of the rail, which is beveled, the extreme edge being turned up and nailed to the inner face of the rail as shown.

The inner panel 28 is similarly formed, having its regular arrangement of upwardly opening louvers 30 and marginal flanges 28$^a$ at top and bottom. These flanges are both bent at right angles, the upper flange being inserted and fixed between the rail 21 and the body 24 by the screws 25 as before. The lower flange 28$^a$ is similarly secured in place between the under side of the rail and a beveled bead 31, which surrounds the inside of the window frame, and secured by screws 32.

This type differs in one respect from the previous forms, in that the lower edges of the panels do not have sealing contact with the glass panel. While this feature might be readily added, it is not considered necessary, inasmuch as the permanent rails 20 and 21, form the vertical channel into which the upper edge of the glass panel extends, to fully or practically close the transverse passage through the openings in the rails. However, the crevices between the glass and the rails are not sufficient to materially affect the air movement and facing downwardly, prevent the entrance of rain or snow. Thus, the ventilating panels function in the manner already described and except for the structural features, the results obtained by the several modifications are the same.

I claim as my invention:

1. A ventilator for closed vehicles comprising louvered panels adapted to be mounted in a window opening transversely of the direction of movement of the adjustable glass panel thereof, said panels being spaced apart with an entrance opening to permit the passage of the glass panel therebetween to regulate the passage of air through said louvers, and means for providing sealing contact between the glass panel and the edges of said ventilating panels along said entrance opening.

2. A ventilator for closed vehicle windows, comprising a double walled panel having a predetermined arrangement of louvers in the opposite walls thereof and provided with an opening along one of its longitudinal margins, and cushioning strips along the edges forming said opening.

3. A ventilator for closed vehicle windows, comprising a double walled panel having a predetermined arrangement of louvers in the opposite walls thereof and provided with an opening along one of its longitudinal margins, the edges of said walls along said opening being bent to form inwardly facing rabbets and sealing strips inserted in said rabbets.

4. A ventilator for closed vehicles comprising a relatively flat panel having walls spaced apart substantially the width of the channels in the side and top rails of the window and provided with a slot along one of its longitudinal edges, having cushioning strips therealong, and louvers formed in the spaced walls of said panel, the louvers in one wall opening obliquely to the horizontal and the louvers in the other wall opening vertically.

5. A ventilator for closed vehicle windows, comprising a relatively flat U-shaped panel having a predetermined arrangement of louvers in the opposite walls thereof, said panel being adapted to be secured in the channel of the top rail of the window with its open edge facing downwardly and in alignment with the adjustable glass panel of said window.

Signed at Chicago, Ill. this 22 day of October, 1924.

KENNETH H. BROWNLEE.